United States Patent
Krebs et al.

(10) Patent No.: US 6,906,148 B2
(45) Date of Patent: *Jun. 14, 2005

(54) HOT MELT POLYURETHANE ADHESIVE COMPOSITIONS BASED ON POLYESTER BLOCK COPOLYMERS

(75) Inventors: Michael Krebs, Hilden (DE); Christoph Lohr, Wuppertal (DE); Andreas Brenger, Duesseldorf (DE); Ingolf Scheffler, Neuss (DE)

(73) Assignee: Henkel Kommanditgesellschaft auf Aktien, Duesseldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 10/297,541
(22) PCT Filed: May 30, 2001
(86) PCT No.: PCT/EP01/06127

§ 371 (c)(1),
(2), (4) Date: Dec. 4, 2002

(87) PCT Pub. No.: WO01/96436

PCT Pub. Date: Dec. 20, 2001

(65) Prior Publication Data

US 2003/0144454 A1 Jul. 31, 2003

(30) Foreign Application Priority Data

Jun. 10, 2000 (DE) .......................... 100 28 810

(51) Int. Cl.$^7$ .............................................. C08G 71/04
(52) U.S. Cl. .................... 525/440; 525/131; 525/408; 525/411; 525/439; 528/76; 528/80; 528/83
(58) Field of Search ................... 525/440, 131, 525/408, 411, 439; 528/76, 80, 83

(56) References Cited

U.S. PATENT DOCUMENTS

| 4,985,535 A | * | 1/1991 | Takada ........................ 528/272 |
| 5,019,638 A | | 5/1991 | Muller et al. |
| 5,137,984 A | | 8/1992 | Kangas et al. |
| 5,965,662 A | | 10/1999 | Krebs et al. |

FOREIGN PATENT DOCUMENTS

| DE | 38 27 224 C2 | 7/1998 |
| DE | 199 61 941 A1 | 7/2001 |
| EP | 0 340 906 A1 | 11/1989 |
| EP | 0 455 400 A2 | 11/1991 |
| EP | 0 568 607 B2 | 7/1997 |
| WO | WO 91/15530 A1 | 10/1991 |

OTHER PUBLICATIONS

Huber et al., "Shaping Reactive Hotmelts Using LMW Copolyesters", Adhesive Age, pp. 32–35 (1987).

* cited by examiner

*Primary Examiner*—Jeffrey B. Robertson
(74) *Attorney, Agent, or Firm*—Stephen D. Harper

(57) ABSTRACT

The present invention relates to compositions comprising reaction products of a polyisocyanate with a polyester block copolymer and a process for the preparation thereof. These are suitable as a moisture-curing hot melt adhesive. The hot melt adhesive composition may optionally also comprise a reaction product of a polyisocyanate with a polyester polyol and/or a reaction product of a polyisocyanate with a polyether polyol. Such polyurethane hot melt adhesive compositions have good creep resistance and interfacial adhesion values on plastics and show very high strength values.

30 Claims, No Drawings

HOT MELT POLYURETHANE ADHESIVE COMPOSITIONS BASED ON POLYESTER BLOCK COPOLYMERS

RELATED APPLICATIONS

This application is filed under 35 U.S.C. 371(c) claiming priority of PCT/EP01/06127 filed May 30, 2001, which claims priority from DE 100 28 810.3 filed Jun. 10, 2000, the contents of each application are incorporated herein by reference.

This invention relates to compositions containing reaction products of a polyisocyanate with a polyester block copolymer and the use thereof as a hot melt adhesive and a process for the preparation thereof.

FIELD OF THE INVENTION

Background of the Invention

Reaction products of a stoichiometric excess of polyisocyanates with polyols, so-called polyurethane prepolymers having isocyanate end groups, are used in a large number of fields, for example as sealing compounds, coating materials or adhesives. If these composition are solid at room temperature and may be melted when warm or hot with exclusion of moisture, they may be employed as reactive hot melt adhesives. Reactive one-component polyurethane hot melt adhesives in the sense of the present invention are thus moisture-curing or moisture-crosslinking adhesives which are solid at room temperature and are applied as an adhesive in the form of a melt, and in which the polymeric constituents contain urethane groups and reactive isocyanate groups. By the cooling of such a melt via the application to the substrate and the further cooling of the melt by the substrate components, rapid physical setting of the hot melt adhesive initially takes place by solidification thereof, followed by a chemical reaction of the isocyanate groups still present with moisture from the environment to give a crosslinked adhesive which cannot be melted.

Reactive hot melt adhesives based on polyurethane prepolymers having isocyanate end groups are known in principle, and H. F. Huber and H. Müller thus describe, in "Shaping Reactive Hotmelts Using LMW Copolyesters", Adhesives Age, November 1987, page 32 to 35, the combination of amorphous and crystalline polyesters having isocyanate end groups which are said to have good adhesion to the most diverse substrates. Formulations which comprise polyester block copolymers having isocyanate end groups are not disclosed.

EP-A-340906 describes polyurethane hot melt adhesive compositions comprising a mixture of at least two amorphous polyurethane prepolymers, which are characterized in that the prepolymers have different glass transition temperatures. Such mixtures of two prepolymers are said to improve the properties of the adhesive to the effect that they set rapidly, are still flexible immediately after setting, and have a good heat stability after curing.

DE-A-3827224 describes rapidly-setting moisture-curing hot melt adhesives of reaction products of polyisocyanates and hydroxypolyesters. The hydroxypolyesters here are preferably purely aliphatic and usually have at least 12 methylene groups in the polyester unit of diol and dicarboxylic acid. They may also comprise here, as diols, ether diols, that is to say oligomeric compounds or polymers based on ethylene glycol or butane-1,4-diol, but this is not preferred.

EP-A-455400 describes a mixture of polyurethane prepolymers having isocyanate end groups, which substantially comprises a first crystalline prepolymer based on polyhexamethylene adipate and a second prepolymer based on polytetramethylene ether glycol. It is stated that these compositions have a very good adhesion to a large number of surfaces.

EP-A-568607 describes a mixture of polyurethane prepolymers having isocyanate end groups comprising a first prepolymer based on the reaction product of an at least partly crystalline polyester polyol and a polyisocyanate and a second prepolymer based on the reaction product of a poly(tetramethylene ether) glycol and a polyisocyanate, and a third prepolymer based on the reaction product of an amorphous polyester polyol and a polyisocyanate. The amorphous polyester polyol for the third prepolymer should preferably be built from at least a proportion of aromatic structural units. To improve the cohesive strength of the hot melt adhesives, the molecular weight, in particular of the vitreous polyester polyol, should be as high as possible. However, this results in extremely highly viscous polymers which are difficult to mix and difficult to apply at the use temperature. It is stated that these hot melt adhesives are particularly suitable for bonding polymeric substrates, such as polystyrene or polymethyl methacrylate.

WO 91/15530 describes moisture-curing polyurethane hot melt adhesives which combine the properties of thermoplastic hot melt adhesives and reactive adhesives. Mixtures of a thermoplastic elastomer based on a polyester-polyether copolymer and a polyisocyanate prepolymer are described. The thermoplastic elastomer here should be a segmented thermoplastic elastomer having hard and soft segments and the polyisocyanate prepolymer should be the reaction product of a polyol with a polyfunctional isocyanate having an isocyanate functionality of 2 or more. A preferred polyol for the polyurethane prepolymer is poly(tetramethylene ether) glycol. It is stated that these adhesives are suitable for bonding glass, metal and a number of plastics.

DE-A-19961941.7, which is still unpublished, describes compositions comprising reaction products of a polyisocyanate with a polyester-polyether copolymer, a process for the preparation thereof and use thereof as reactive hot melt adhesives. It is proposed therein to prepare these copolymers from polyester structural units having carboxyl end groups and polyether polyols. Although these hot melt adhesives already meet many technical requirements of modern hot melt adhesives, they cannot be employed in quite a number of fields.

In spite of the extensive prior art, there thus continues to be a need for improved polyurethane compositions which are suitable for use as hot melt adhesives. In particular, the raw materials employed for the hot melt adhesives should be easily and inexpensively accessible. A better compatibility of the individual polymer components is desirable for problem-free application. Furthermore, the hot melt adhesives should have a broad adhesion spectrum to a large number of substrates and the highest possible strength after curing.

BRIEF OF THE INVENTION

The achievement according to the present invention may be found in the claims. It substantially comprises providing a polyurethane composition for use in hot melt adhesives comprising a reaction product of a polyisocyanate with a polyester block copolymer of the formula (I):

$$HO-R^2-O-A-O-R^1-OH \qquad (I)$$

wherein A represents —R³—X—C(O)—R⁴—C(O)—X—R³—

R¹ and R² independently represent (—(CH₂)₄—O—(CH₂)₄—)ₒ, (—C₃H₆—O—C₃H₆—)ₒ, (—C₂H₄—O—C₂H₄—)ₚ, the radical of a polybutadiene, polycarbonate or a polycaprolactone or a combination thereof, X+R³ together represent a covalent bond or X represents O and R³ represents —(CH₂)ₘ—, and R⁴ represents a radical of a polyester, having carboxyl end groups, of a $C_{4-C12}$ diol and a $C_{6-C14}$ dicarboxylic acid after removal of the terminal carboxyl groups, and m=4 to 12, o=5–80 and p=5–80.

DETAILED DESCRIPTION OF THE INVENTION

Preferably, —O-A-O— is the radical of a polyester having hydroxyl end groups built from aliphatic dicarboxylic acids and difunctional aliphatic alcohols. Preferred examples of aliphatic dicarboxylic acids are adipic acid, pimelic acid, suberic acid, azelaic acid, sebacic acid, undecanedioic acid, dodecanedioic acid or optionally mixtures thereof. Preferred examples of difunctional aliphatic alcohols are butanediol, hexanediol, octanediol, decanediol, dodecanediol or optionally mixtures thereof. Dicarboxylic acids and diols having an even number of carbon atoms are particularly preferred here.

Particularly preferred polyester structural units having hydroxyl end groups are polyester structural units of adipic acid, sebacic acid or dodecandioic acid and 1,4-butanediol, 1,6-hexanediol, 1,8-octanediol, 1,10-decanediol or 1,12-dodecanediol. The polyester block here may have a molecular weight of between 1,000 and 10,000, preferably between 1,500 and 8,000. R¹ and/or R² represent blocks built from polyether-ols, such as poly(oxytetramethylene)glycol, also termed poly-tetrahydrofuran (poly-THF), poly(oxyalkylene) glycols, such as poly(oxyethylene)glycol, poly(oxypropylene)glycol, poly(oxybutylene)glycol or copolymers thereof, and polybutadiene, polycarbonate or polycaprolactone, the latter being particularly preferred. In principle, R¹ and/or R² may also represent a further block of a polyester which contains structural units other than the polyester block —O-A-O—. If the polyether block comprises poly-THF, the molecular weight should be between 250 and 6,000, preferably between 600 and 4,000. If the polyether block comprises poly(oxyalkylene)glycols, it has a molecular weight of between 1,000 and 6,000, preferably between 1,000 and 4,000. In the case where R¹ and/or R² represent polycaprolactone, the molecular weight of this block is between 80 and 4,000. preferably between 500 and 4,000.

The copolymer (I) may be prepared by condensation of a corresponding polyester with carboxyl end groups having a polyether-ol, hydroxy-functional polybutadiene, polycarbonate diol or another polyester diol. In the case of the block copolymer containing polycaprolactone, a hydroxy-functional polyester is the starting material and caprolactone is polymerized on to it. In principle, however, it is also possible to prepare such a copolymer by condensation of the individual components of polyether polyol, aliphatic dicarboxylic acid and difunctional alcohol in a single condensation step.

A preferred embodiment of the polyester block copolymer (I) is prepared from a central polyester block comprising hexanediol adipate or a polyester based on dodecandioic acid and hexanediol or octanediol and a polycaprolactone polymerized on to the hydroxyl groups on one or both sides, that is to say this is a reaction product of a polyester polyol with caprolactone. The polycaprolactone block here may have a molecular weight of 80 to 4,000. The entire block copolymer (I) then has a molecular weight of between 1,000 and 15,000, preferably between 2,500 and 8,000. The above-mentioned ranges also apply to the molecular weights in an analogous manner in the case where R¹ and/or R² represent a polyether block, a polybutadiene block, another polyester block or a polycarbonate block.

The hydroxyl numbers of the polyester block copolymers according to the present invention are between 7.5 and 112, preferably between 14 and 45. This corresponds to a molecular weight range from 1,000 to 15,000, preferably from 1,500 to 8,000. The proportion, by weight, here of the R¹ and/or R² block to the polyester block —O-A-O— is between about 5 and 300%.

A large number of aliphatic, cycloaliphatic or aromatic polyisocyanates may be employed as the polyisocyanate.

Examples of suitable aromatic polyisocyanates are: all isomers of toluylene-diisocyanate (TDI), either in the isomerically pure form or as a mixture of several isomers, naphthalene-1,5-diisocyanate, diphenylmethane-4,4'-diisocyanate (MDI), diphenylmethane-2,4'-diisocyanate and mixtures of 4,4'-diphenylmethane-diisocyanate with the 2,4' isomer or mixtures thereof with oligomers of higher functionality (so-called crude MDI), xylylene-diisocyanate (XDI), 4,4'-diphenyl-dimethylmethane-diisocyanate, di- and tetra-alkyl-diphenylmethane-diisocyanate, 4,4'-dibenzyl-diisocyanate, 1,3-phenylene-diisocyanate and 1,4-phenylene-diisocyanate. Examples of suitable cycloaliphatic polyisocyanates are the hydrogenation products of the above-mentioned aromatic diisocyanates, such as 4,4'-dicyclohexylmethane-diisocyanate ($H_{12}$MDI), 1-isocyanatomethyl-3-isocyanato-1,5,5-trimethyl-cyclohexane (isophorone-diisocyanate, IPDI), cyclohexane-1,4-diisocyanate, hydrogenated xylylene-diisocyanate ($H_6$XDI), 1-methyl-2,4-diisocyanato-cyclohexane, m- or p-tetramethylxylene-diisocyanate (m-TMXDI, p-TMXDI) and dimer-fatty acid diisocyanate. Examples of aliphatic polyisocyanates are tetramethoxybutane-1,4-diisocyanate, butane-1,4-diisocyanate, hexane-1,6-diisocyanate (HDI), 1,6-diisocyanato-2,2,4-trimethylhexane, 1,6-diisocyanato-2,4,4-trimethylhexane and 1,2-dodecane-diisocyanate ($C_{12}$DI).

The polyurethane hot melt adhesive compositions according to the present invention may optionally also comprise, as an admixed component, further prepolymers in the form of reaction products of one of the above-mentioned polyisocyanates with a polyester polyol and/or optionally a reaction product of one of the above-mentioned polyisocyanates with a polyether polyol.

Examples of such polyester polyols are reaction products of dicarboxylic acids, such as glutaric acid, adipic acid, pimelic acid, suberic acid, azelaic acid, sebacic acid, undecanedioic acid, dodecanedioic acid, 3,3-dimethylglutaric acid, terephthalic acid, isophthalic acid, dimer-fatty acid or mixtures thereof, with low molecular weight difunctional alcohols, such as ethylene glycol, propylene glycol, 1,4-butanediol, 1,6-hexanediol, 1,8-octanediol, 1,10-decanediol, 1,12-dodecanediol, dimer-fatty alcohol, diethylene glycol, triethylene glycol or mixtures thereof. The suitable polyester polyols may optionally also have a slight degree of branching, that is minor amounts of a tricarboxylic acid or a trifunctional alcohol, for example glycerol or trimethylolpropane, have been co-used for the preparation thereof. Another group of polyester polyols which are to be co-used according to the present invention are the polyesters based on ε-caprolactone, also called "polycaprolactones". However, it is also possible to use polyester polyols of oleochemical origin. Such polyester polyols may be prepared, for example, by complete ring-opening of epoxidized triglycerides of a fat mixture comprising at least partly olefinically unsaturated fatty acids with one or more alcohols having 1 to 12 carbon atoms and subsequent partial transesterification of the triglyceride derivatives to give alkyl ester polyols having 1 to 12 carbon atoms in the alkyl radical. Further suitable polyols are polycarbonate polyols and dimer diols (Henkel), as well as castor oil and derivatives thereof.

Examples of the polyether polyols to be co-used according to the present invention for the further prepolymers are di- and/or trifunctional polypropylene glycols in the molecular weight range from 200 to 15,000, preferably from 400 to 4,000. Random and/or block copolymers of ethylene oxide and propylene oxide may also be employed.

The reaction of the individual polyol units (I) or of the further polyester polyol or of the polyether polyol with the polyisocyanate is carried out in a known manner by reaction of a stoichiometric excess of polyisocyanate with respect to the polyol compound. The stoichiometric ratio of OH groups to NCO groups is usually 1:1.2 to 1:15, preferably 1:1.4 to 1:2.5.

For preparation of the polyurethane prepolymers having isocyanate end groups it may be necessary to add known polyurethane catalysts, such as compounds of 2- or 4-valent tin, in particular to employ dicarboxylates of 2-valent tin or dialkyltin dicarboxylates or dialkyltin dialkylates.

Furthermore it may be necessary to add to the hot melt adhesive compositions catalysts for accelerated curing with the moisture of the environment, and there may be mentioned in particular acyclic and in particular cyclic amino compounds, examples which may be mentioned being tetramethylbutane-diamine, bis(dimethylaminoethyl) ether, 1,4-diazabicyclooctane (DABCO), 1,8-diaza-bicyclo-[5.4.0]-undecene or morpholino derivatives. Examples of such morpholino derivatives are:

bis(2-(2,6-dimethyl-4-morpholino)ethyl)-(2-(4-morpholino)ethyl)amine, bis(2-(2,6-dimethyl-4-morpholino)ethyl)-(2-(2,6-diethyl-4-morpholino)ethyl) amine, tris(2-(4-morpholino)ethyl)amine, tris(2-(4-morpholino)propyl)amine, tris(2-(4-morpholino)butyl) amine, tris(2-(2,6-dimethyl-4-morpholine)ethyl)amine, tris (2-(2,6-diethyl-4-morpholino)ethyl)amine, tris(2-(2-methyl-4-morpholino)ethyl)amine or tris(2-(2-ethyl-4-morpholino) ethyl)amine, dimethylaminopropylmorpholine, bis-(morpholinopropyl)-methylamine, diethylaminopropylmorpholine, bis-(morpholinopropyl)-ethylamine, bis-(morpholinopropyl)-propylamine, morpholinopropylpyrrolidone or N-morpholinopropyl-N'-methyl-piperazine, 2,2'-dimorpholinodiethyl ether (DMDEE) or di-(2,6-dimethylmorpholinoethyl) ether.

The amounts of the above-mentioned catalysts to be employed may vary within wide limits and depend on the type of catalyst, its activity, the conditions of use and the storage conditions required for the hot melt adhesive. For the above-mentioned morpholino derivatives, in particular the particularly preferred DMDEE, catalyst concentrations of between 0.0002 and 1.5 wt. %, based on the total adhesive formulation, are usual.

The compositions according to the present invention may furthermore comprise further conventional additives for hot melt adhesives, examples which may be mentioned being tackifying resins, such as abietic acid, abietic acid esters, terpene resins, terpene-phenol resins or hydrocarbon resins. Fillers, for example silicates, talc, calcium carbonates, clays, carbon black or colored pastes or pigments, may furthermore be employed in minor amounts in certain circumstances.

The selection of the individual components, in particular the polyol components, depends on the intended use and the desired final properties. It has been found that due to the block structure of the polyester block copolymers (I), with appropriate selection of the block length, an improved compatibility with respect to hot melt adhesives based on conventional polyester polyols of the prior art may be achieved, which may be seen from the fact that the hot melt adhesive compositions according to the present invention are as a rule transparent in the molten state (as long as they comprise no fillers, pigments or similar components). Excellent creep resistance and interfacial adhesion values have furthermore been observed with the compositions according to the present invention, and very high strength values have additionally been achieved.

The hot melt adhesives according to the present invention are suitable for bonding a large number of substrates, in particular for bonding metallic substrates, and most particularly for bonding diverse plastics substrates.

Examples of preferred fields of use of the hot melt adhesives according to the present invention are assembly bonding in the wood and furniture industry and clips bonding in automobile construction. In the last mentioned field of use, the clips, also termed "retainers", of ABS are bonded against resin-bonded moldings, such as are commercially available, for example, from Empe under the trade name "Empeflex". Another field of use is sheathing of profiles in wood, furniture and window construction. In this field, PVC profiles are bonded with PVC decorative films over the entire surface.

The following Examples are intended to explain the present invention in more detail, the selection of examples not representing a limitation of the scope of the subject matter of the present invention. In the compositions, all the amounts stated here are parts, by weight, unless indicated otherwise.

EXAMPLES

Example 1

3,600 g of a polyester (hexanediol dodecanoate, OH number 32.5 mg KOH/g: acid number 2 mg KOH/g) were initially introduced into a reaction tank at 120° C. 365 g caprolactone monomer and, in an amount of 1.9 g, butyltin tris(2-ethylhexanoate) as a catalyst were added to the molten polyester at 120° C. under a nitrogen atmosphere. After a reaction time of 4 h at 160° C., the reaction had ended. Traces of residual caprolactone monomer were removed in vacuo. The polyester block copolymer had the following characteristic values: OH number 29 mg KOH/g; acid number 1.9 mg KOH/g, melting point 69° C.

Example 2

A reactive hot melt adhesive was prepared from the following polyester diols and diisocyanates:

| | |
|---|---|
| 24.18 parts | amorphous copolyester based on terephthalic acid, isophthalic acid, neopentylglycol, hexanediol and ethylene glycol, OH number 21, $T_g$ 40° C. |
| 11.46 parts | copolyester based on adipic acid, neopentylglycol, hexanediol and ethylene glycol, OH number 21, $T_g$ −50° C. |

-continued

| 32.74 parts | copolyester based on adipic acid and hexanediol, OH number 30, melting point 60° C. |
| 20.72 parts | polyester block copolymer according to Example 1 |
| 10.88 parts | 4,4'-diphenylmethane-diisocyanate |

The hot melt adhesive had the following characteristic values:

NCO content: 1.8%

Viscosity at 130° C. (Brookfield Thermocell): 12,000 mPa.s

Adhesion experiments were carried out using the hot melt adhesive prepared in this way on various substrates, in which the following results were obtained:

| Substrate | Type of fracture |
|---|---|
| Leather | 1 MaF |
| Birkenstock sole | 2 MaF |
| Flexible PVC | 3 WF |
| White PVC | 4 slight WF |
| Black ABS | 3 slight WF |
| White ABS | 2 slight WF |
| NBR | 3 slight WF |
| Chip board | 1 MaF |
| Wood | 3 slight MaF |
| Glass | 2 cohesive |

The entries in the Table have the following meanings:
WF White fracture in the substrate material
MaF Material fracture in the substrate
MiF Mixed fracture in the substrate and in the adhesive join
PVC Polyvinyl chloride
ABS Acrylonitrile/butadiene/styrene
NBR Nitrile rubber
cohesive Fracture in the adhesive join The adhesion is rated according to the following scale: 1=very good adhesion to 6=very poor adhesion.

It is clear from these adhesion experiments that the hot melt adhesives according to the present invention have good adhesion properties on a large number of substrates.

We claim:

1. A polyurethane hot melt adhesive composition comprising:

(a) at least one reaction product of at least one polyisocyanate with at least one polyester block copolymer of the formula:

HO—R²—O-A-O—R¹—OH (I)

(b) optionally at least one reaction product selected from the group consisting of reaction of polyisocyanates with polyester polyols, reaction products of polyisocyanates with polyether polyols and mixtures thereof; wherein A represents —R³—X —C(O) —R⁴—C (O)—X —R⁵—R¹ and R² independently represent (—(CH₂)₄—O—(CH₂)₄—)ₒ, (—C₃H₆—O—C₃H₈—)ₒ, (—C₂H₄—O—C₂H₄—)ₚ, a polycarborlate residue, a polycaprolactone residue or a combination thereof, X+R³ together represent a covalent bond or X represents O and R³ represents —(CH₂)ₘ—, and R⁴ represents a residue of a polyester, having carboxyl end groups, of at least one C₄–C₁₂ diol and at least one C₆–C₁₄ dicarboxylic acid after removal at the terminal carboxyl groups, and m=4 to 12, o=5–80 and p=5–80.

2. The composition as claimed in claim 1 wherein said at least one C₆–C₁₄ dicarboxylic acid is selected from the group consisting of adipic acid, pimelic acid, suberic acid, azelaic acid, sebacic acid, undecanedioic acid, and dodecanedioic acid and mixtures thereof, and said at least one C₄–C₁₂ diol is selected from the group consisting of butanediol, hexanediol, octanediol, decanediol, dodecanediol and mixtures thereof.

3. The composition as claimed in claim 2 wherein the polyester block copolymer has a molecular weight of between 1,000 and 10,000.

4. The composition as claimed in claim 1 wherein at least one of R¹ and R² has a molecular weight of between 80 and 15,000.

5. The composition as claimed in claim 1 wherein at least one of R¹ and R² is the residue of a polycaprolactone having a molecular weight of between 80 and 4,000.

6. The composition as claimed in claim 1 comprising as component (b) at least one reaction product of at least one polyisocyanate and at least one polyester polyol wherein the polyester polyol comprises: (1) residues of at least one dicarboxylic acid selected from the group consisting of adipic acid, pimelic acid, suberic acid, azelaic acid, sebacic acid, undecanedioic acid, dodecanedioic acid, dimer acid, and 3,3-dimethylglutaric acid, terephthalic acid, isophthalic acid, naphthalenedicarboxylic acid and mixtures thereof, and (2) residues of at least one difunctional alcohol selected from the group consisting of ethylene glycol, propylene glycol, butanediol, diethylene glycol, triethylene glycol, dipropylene glycol, tripropylene glycol, hexanediol, octanediol, decanediol, dodecanediol, neopentylglycol, dimer diol, hydroxypivalic acid-neopentylglycol and mixtures thereof.

7. The composition as claimed in claim 1 comprising as component (b) at least one reaction product of at least one polyisocyanate and at least one polyether polyol wherein the polyether polyol is selected from the group consisting of polypropylene glycol, polyethylene glycol, copolymer of ethylene oxide and propylene oxide and poly (oxytetramethylene) glycol.

8. The composition as claimed in claim 1 comprising:
(1) 5 to 100 wt. % (a);
(2) 0 to 80 wt. % of the reaction product of the polyisocyanate and the polyester polyol; and
(3) 0 to 80 wt. % of the reaction product of the polyisocyanate and the polyether polyol.

9. The composition of claim 3 wherein the polyester block copolymer has a molecular weight between 1,500 and 8,000.

10. The composition of claim 4 wherein at least one of R¹ and R² has a molecular weight between 600 and 4,000.

11. The composition of claim 5 wherein the molecular weight of the residue of the polycaprolactone is between 500 and 4,000.

12. The composition of claim 2 comprising as component (b) at least one reaction product of at least one polyisocyanate and at least one polyester polyol wherein the polyester polyol comprises: (1) residues of at least one dicarboxylic acid selected from the group consisting of adipic acid, pimelic acid, suberic acid, azelaic acid, sebacic acid, undecanedioic acid, dodecanedioic acid, dimer acid, 3,3-dimethylglutaric acid, terephthalic acid, isophihalic acid, naphthalenedicarboxylic acid and mixtures thereof, and (2) residues of at least one difunctional alcohol selected from the group consisting of ethylene glycol, propylene glycol, butanediol, diethylene glycol, triethylene glycol, dipropylene glycol, tripropylene glycol, hexanediol, octanediol, decanediol, dodecanediol, neopentylglycol, dimer diol, hydroxypivalic acid-neopentylglycol and mixtures thereof.

13. The composition of claim 3 comprising as component (b) at least one reaction product of at least one polyisocyanate and at least one polyester polyol wherein the polyester polyol (b) comprises: (1) residues of at least one dicarboxylic acid selected from the group consisting of adipic acid, pimelic acid, suberic acid, azelaic acid, sebacic acid, undecanedioic acid, dodecanedioic acid, dimer acid 3,3-dimethylglutaric acid, terephthalic acid, isophihalic acid, naphthalenedicarboxylic acid and mixtures thereof, and (2) residues of at least one difunctional alcohol selected from the group consisting of ethylene glycol, propylene glycol, butanediol, diethylene glycol, triethylene glycol, dipropylene glycol, tripropylene glycol, hexanediol, octanediol, decanediol, dodecanediol, neopentylglycol, dimer diol, hydroxypivalic acid-neopentylglycol and mixtures thereof.

14. The composition of claim 4 comprising as component (b) at least one reaction product of at least one polyisocyanate and at least one polyester polyol wherein the polyester polyol comprises: (1) residues of at least one dicarboxylic acid selected from the group consisting of adipic acid, pimelic acid, suberic acid, azelaic acid, sebacic acid, undecanedioic acid, dodecanedioic acid, dimer acid, 3,3-dimethylglutaric acid, terephthalic acid, isophthalic acid, naphthalenedicarboxylic acid and mixtures thereof, and (2) residues of at least one difunctional alcohol selected from the group consisting of ethylene glycol, propylene glycol, butanediol, diethylene glycol, triethylene glycol, dipropylene glycol, tripropylene glycol, hexanediol, octanediol, decanediol, dodecanediol, neopentylglycol, dimer dial, hydroxypivalic acid-neopentylglycol and mixtures thereof.

15. The composition of claim 5 comprising as component (b) at least one reaction product of at least one polyisocyanate and at least one polyester polyol wherein the polyester polyol comprises: (1) residues of at least one dicarboxylic acid selected from the group consisting of adipic acid, pimelic acid, suberic acid, azelaic acid, sebacic acid, undecanedioic acid, dodecanedioic acid, dimer acid, 3,3-dimethylglutaric acid, terephthalic acid, isophthalic acid, naphthalenedicarboxylic acid and mixtures thereof, and (2) residues of at least one difunctional alcohol selected from the group consisting of ethylene glycol, propylene glycol, butanediol, diethylene glycol, triethylene glycol, dipropylene glycol, tripropylene glycol, hexanediol, octanediol, decanediol, dodecanediol, neopentylglycol, dimer diol, hydroxypivalic acid-neopentylglycol and mixtures thereof.

16. The composition as claimed in claim 6 comprising as component (b) at least one reaction product of at least one polyisocyanate and at least one polyether polyol wherein the polyether polyol is selected from the group consisting of polypropylene glycol, polyethylene glycol, copolymer of ethylene oxide and propylene oxide and poly (oxytetramethylene) glycol.

17. The composition as claimed in claim 2 comprising as component (b) at least one reaction product of at least one polyisocyanate and at least one polyether polyol wherein the polyether polyol is selected from the group consisting of polypropylene glycol, polyethylene glycol, copolymer of ethylene oxide and propylene oxide and poly (oxytetramethylene) glycol.

18. The composition as claimed in claim 3 comprising as component (b) at least reaction product of at least polyisocyanate and at least one polyether polyol wherein the polyether polyol is selected from the group consisting of polypropylene glycol, polyethylene glycol, copolymer of ethylene oxide and propylene oxide and poly (oxytetramethylene) glycol.

19. The composition as claimed in claim 4 comprising as component (b) at least one reaction product of at least polyisocyanate and at least one polyether polyol wherein the polyether polyol is selected from the group consisting of polypropylene glycol, polyethylene glycol, copolymer of ethylene oxide and propylene oxide and poly (oxytetramethylene) glycol.

20. The composition as claimed in claim 5 comprising as component (b) at least one reaction product of at least one polyisocyanate and at least one polyether polyol wherein the polyether polyol is selected from the group consisting of polypropylene glycol, polyethylene glycol, copolymer of ethylene oxide and propylene oxide and poly (oxytetramethylene) glycol.

21. The composition as claimed in claim 6 comprising as component (b) at least one reaction product of at least one polyisocyanate and at least one polyether polyol wherein the polyether polyol is selected from the group consisting of polypropylene glycol, polyethylene glycol, copolymer of ethylene oxide and propylene oxide and poly (oxytetramethylene) glycol.

22. The composition as claimed in claim 2 comprising:
(1) 5 to 100 wt. % (a);
(2) 0 to 80 wt. % of the reaction product of the polyisocyanate and the polyester polyol; and
(3) 0 to 80 wt. % of the reaction product of the polyisocyanate and the polyether polyol.

23. The composition as claimed in claim 3 comprising:
(1) 5 to 100 wt. % (a);
(2) 0 to 80 wt. % of the reaction product of the polyisocyanate and the polyester polyol; and
(3) 0 to 80 wt. % of the reaction product of the polyisocyanate and the polyether polyol.

24. The composition as claimed in claim 4 comprising:
(1) 5 to 100 wt. % (a);
(2) 0 to 80 wt. % of the reaction product of the polyisocyanate and the polyester polyol; and
(3) 0 to 80 wt. % of the reaction product of the polyisocyanate and the polyether polyol.

25. The composition as claimed in claim 5 comprising:
(1) 5 to 100 wt. % (a);
(2) 0 to 80 wt. % of tie reaction product of the polyisocyanate and the polyester polyol; and
(3) 0 to 80 wt. % of the reaction product of the polyisocyanate and the polyether polyol.

26. The composition as claimed in claim 6 comprising:
(1) 5 to 100 wt. % (a);
(2) 0 to 80 wt. % of the reaction product of the polyisocyanate and the polyester polyol; and
(3) 0 to 80 wt. % of the reaction product of tie polyisocyanate and the polyether polyol.

27. The composition as claimed in claim 7 comprising:
(1) 5 to 100 wt. % (a);
(2) 0 to 80 wt. % of the reaction product of the polyisocyanate and the polyester polyol; and
(3) 0 to 80 wt. % of the reaction product of the polyisocyanate and the polyether polyol.

28. The composition as claimed in claim 1 wherein both $R^1$ and $R^2$ are residues of polycaprolactones having molecular weights of between 500 and 4,000.

29. The composition as claimed in claim 1 wherein said at least one polyester block copolymer is prepared by polymerizing caprolactone onto a hydroxyl-functional polyester selected from the group consisting of polyesters prepared by condensation of hexanediol and adipic acid and polyesters prepared by condensation of dodecandioic acid and a diol selected from hexanediol or octanediol.

30. The composition as claimed in claim 29 wherein said at least one polyester block copolymer has a molecular weight of from 1500 to 8000.

* * * * *

UNITED STATES PATENT AND TRADEMARK OFFICE
CERTIFICATE OF CORRECTION

PATENT NO. : 6,906,148 B2
DATED : June 14, 2005
INVENTOR(S) : Krebs et al.

It is certified that error appears in the above-identified patent and that said Letters Patent is hereby corrected as shown below:

<u>Column 7,</u>
Line 52, after "reaction" insert -- products --.
Line 56, delete "$R^5$" and insert -- $R^3$ --.
Line 58, delete "$H_8$" and insert -- $H_6$ --.
Lines 58-59, delete "polycarborlate" and insert -- polycarbonate --.

<u>Column 8,</u>
Line 24, delete "and".
Line 60, delete "isophihalic" and insert -- isophthalic --.

<u>Column 9,</u>
Line 7, after "dimer acid", insert -- , --.
Line 8, delete "isophihalic" and insert -- isophthalic --.
Line 57, after every instance of "least" insert -- one --.
Line 64, after "least" insert -- one --.

<u>Column 10,</u>
Lines 37 and 45, delete "tie" and insert -- the --.

Signed and Sealed this

Eleventh Day of April, 2006

JON W. DUDAS
*Director of the United States Patent and Trademark Office*